Dec. 15, 1959  J. D. BEETS  2,917,186
SUN VISOR
Filed June 19, 1957  3 Sheets-Sheet 1
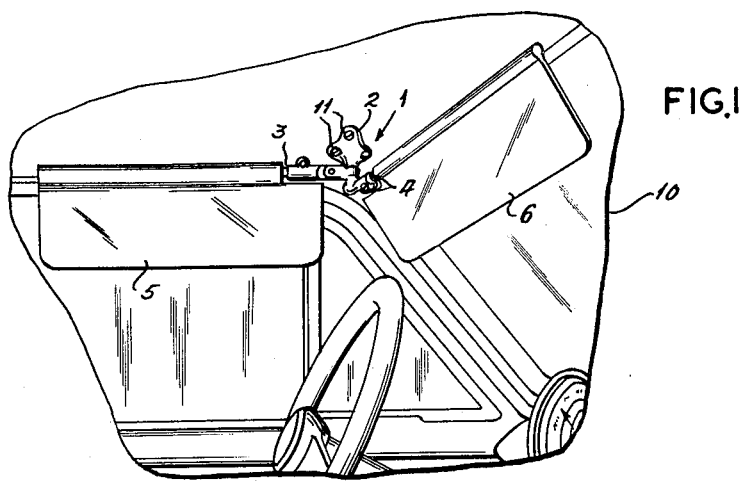
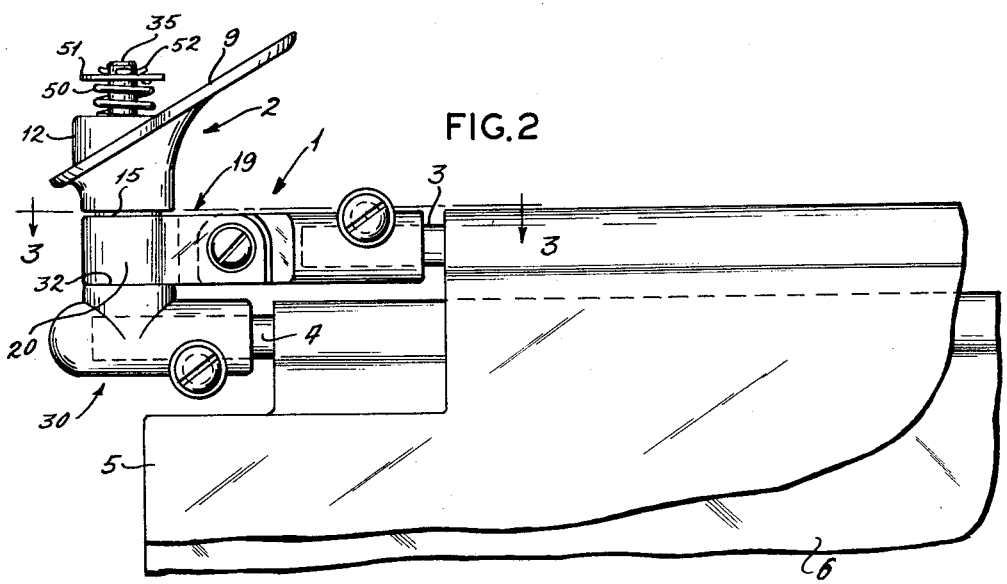
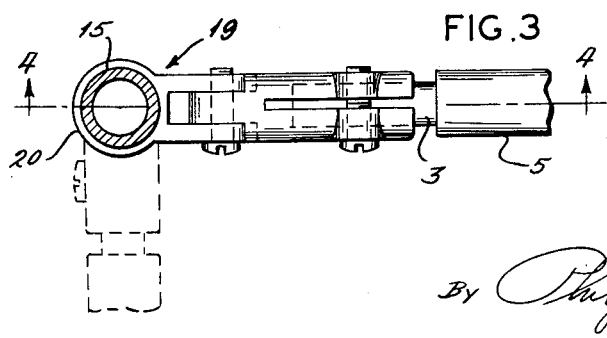
INVENTOR:
JAMES D. BEETS
BY
ATTORNEY Dec. 15, 1959   J. D. BEETS   2,917,186
SUN VISOR
Filed June 19, 1957   3 Sheets-Sheet 2
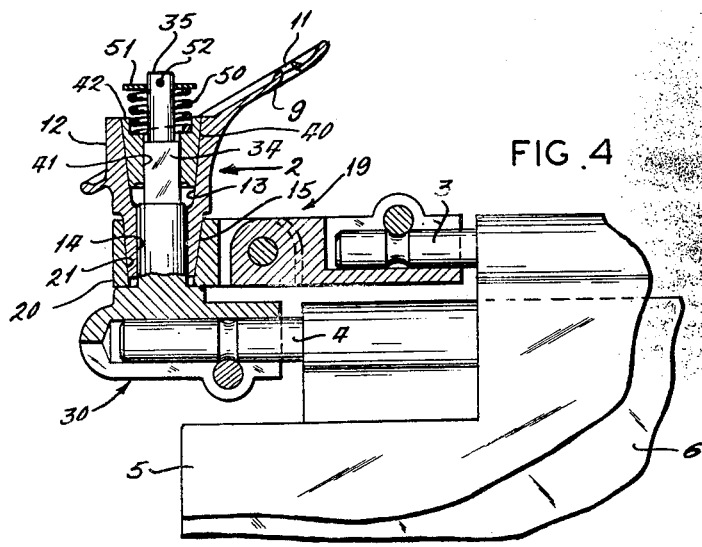
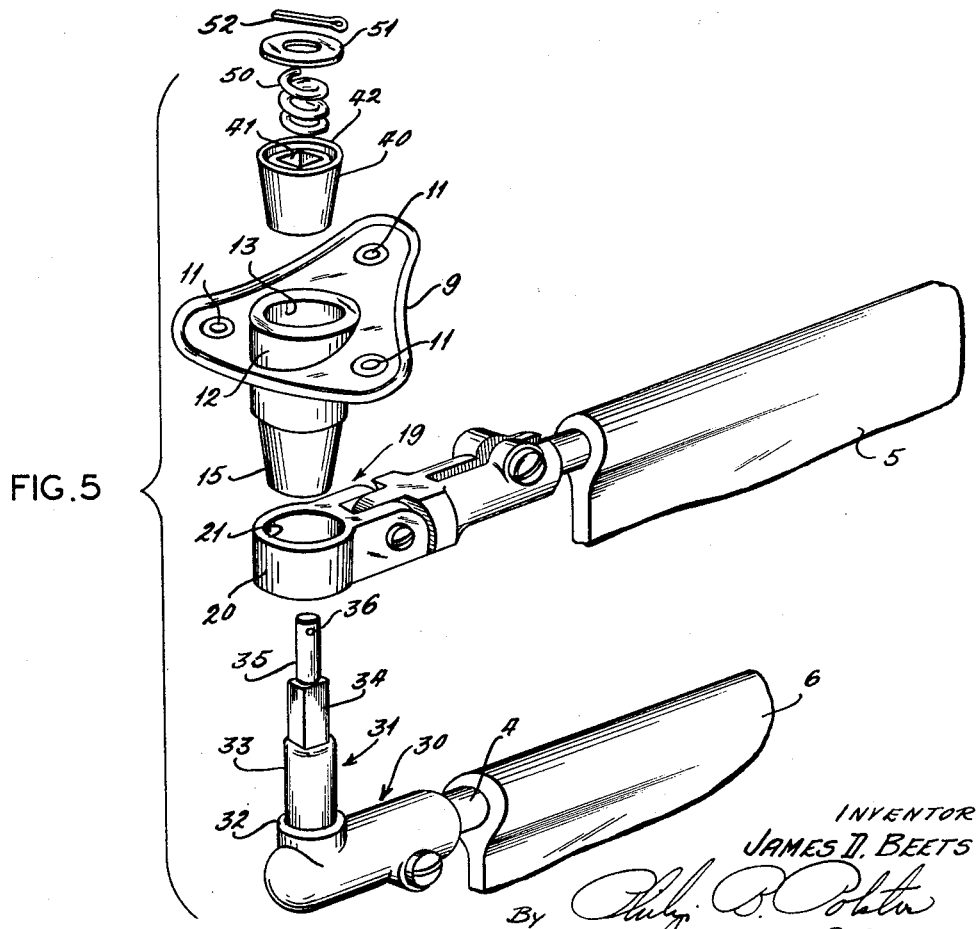
INVENTOR
JAMES D. BEETS
ATTORNEY Dec. 15, 1959   J. D. BEETS   2,917,186
SUN VISOR Filed June 19, 1957   3 Sheets-Sheet 3

INVENTOR:
JAMES D. BEETS
By Philip B. Slater
ATTORNEY.

United States Patent Office 2,917,186
Patented Dec. 15, 1959

2,917,186

SUN VISOR

James D. Beets, Jefferson City, Mo., assignor to
The Beham Co., a partnership

Application June 19, 1957, Serial No. 666,639

4 Claims. (Cl. 211—97)

This invention relates to double shade sun visors of the general character of those described in my Patent No. 2,634,161, granted April 7, 1953.

The present application is a continuation-in-part of application Serial No. 393,829, filed November 23, 1953, now abandoned.

Such a double sun visor is provided with a side shade and a front shade. Each of these shades is provided with a rod and is mounted for rotation about a vertical axis on a rod-supporting bracket.

One of the objects of this invention is to provide a sun visor with a mounting for the rod supporting brackets which permits smooth and easy rotation of the brackets and, at the same time, is effective to hold the brackets in any desired position.

Another object of this invention is to provide such a mounting which is self-adjusting, compensating for wear.

Other objects will become apparent to those skilled in the art in the light of the following disclosure and accompanying drawing.

In accordance with this invention, generally stated, a bracket mounting is provided in which all of the relatively moving bearing surfaces are coned in such a way as to permit easy adjustment of the frictional engagement of the parts, and to be self-compensating for wear. The construction is such that the side shade bracket and the front shade bracket may be moved independently. The device is simple and compact and may be adapted to use in vehicles having either a conventional automobile roof construction or convertible and hard top types.

In the drawing:

Figure 1 is a view in perspective of a double sun visor with a mounting bracket constructed in accordance with one embodiment of this invention, mounted in a conventional type closed automobile;

Figure 2 is a view in side elevation, with the sun shades and sun shade rods partly broken off, of the device shown in Figure 1;

Figure 3 is a sectional view taken along the line 3—3 of Figure 2;

Figure 4 is a sectional view taken along the line 4—4 of Figure 3;

Figure 5 is an exploded view of the embodiment of device shown in Figures 2–4;

Figure 6:
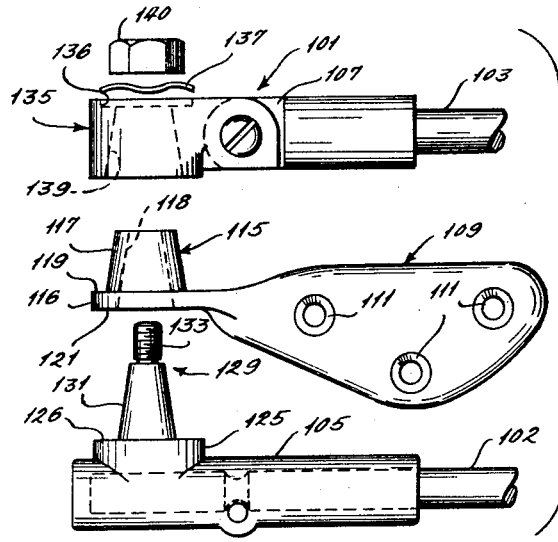
Figure 6 is an exploded view in side elevation of a mounting constructed in accordance with another embodiment of this invention.

Referring now to the drawing and particularly to Figures 1 through 5 for one illustrative embodiment of this invention, reference numeral 1 indicates a complete sun visor assembly, which includes a mounting assembly 2, a side shade supporting rod 3, a front shade supporting rod 4, a side shade 5, and a front shade 6. As shown in Figure 1, this embodiment of sun visor is particularly adapted to be mounted in the roof of a conventional closed car 10.

The mounting assembly 2 of this embodiment of visor, includes a mounting plate 9, a side shade supporting rod bracket 19, and a front shade supporting rod bracket 30.

The mounting plate 9 is provided with holes 11, through which screws 12 extend into a roof member of the automobile. Integral with the mounting plate 9, is a boss 12. The boss 12 is hollow and open-ended. The inside wall of the upper part of the boss 12 is tapered convergently downwardly, to form a well 13. Between the bottom of the well 13 and the bottom of the hollow boss 12, the inside surface of the boss 12 forms a straight sided bore 14. The outside surface of the lower section of the boss 12 is tapered convergently downwardly, to form an inverted thimble section 15. Because the axis of the well 13, of the bore 14, and the thimble section 15, is the same, and is designed to be substantially vertical when the mounting plate is in position on the underside of the sloping roof of the car, the boss 12 projects above the mounting plate 9 at the down side of the mounting plate, as shown in Figures 2, 4 and 5.

The side shade rod supporting bracket 19 is provided with a sleeve 20. The sleeve 20 is open-ended, and has a tapered bore 21 complementary to the taper of the thimble section 15 of the boss 12. While the taper of the bore 21 is complementary to the taper of the thimble section 15, the inside diameter of the bore 21 is such that when the sleeve 20 is mounted on the thimble section 15, as shown particularly in Figures 2 and 4, the lower margin of the sleeve 20 projects below the lower margin of the thimble section 15.

The front shade rod supporting bracket 30 is provided with an upwardly extending shaft 31. From the annular shoulder 32, a distance equal to the length of the bore 14 of the boss 12 plus the distance of the lower margin of the sleeve 20 below the thimble section 15, the shaft 31 is cylindrical, and of a size closely to fit the bore 14 of the boss 12. Above this cylindrical section 33, the shaft 31 is squared, to form a squared section 34. Above the squared section 34, the shaft 31 has a cylindrical post section 35, of reduced diameter as compared with the cylindrical section 33. Near the upper end of the post section 35, is a hole 36, extending diametrically through the post section.

A conical wedge piece 40, has an outside surface which is tapered convergently downwardly complementarily with the taper of the well 13 of the boss 12. The wedge piece 40 has a square bore 41, dimensioned closely but slidably to admit the square section 34 of the shaft 31 of the front shade supporting rod bracket 30. The top surface of the wedge piece 40 is recessed, to produce a rim 42. A spring 50, mounted on the post 35, bears at its lower end on the wedge piece 40, within the confines of the rim 42, and at its upper end, on a washer 51, held in place by a cotter pin 52, extending through the hole 36 in the post. The spring 50 is a relatively heavy one, and is compressed between the washer 51 and the top of the wedge piece 40.

The assembly of the embodiment of the visor shown in Figures 1 through 5 will be apparent from Figures 4 and 5. The sun shades and shade supporting rods may be mounted on the rod holding brackets either before or after the rod holding brackets are assembled in the mounting assembly. The sleeve 20 is placed on the thimble section 15. The shaft 31 is inserted within the bore 14. The wedge piece 40 is placed on the squared section 34 of the shaft 31. The spring 50 is placed on the post 35. The washer 51 is placed on the post 35 and the spring is compressed sufficiently to permit the insertion in the hole 36 of the cotter pin 52. The entire device is then mounted on the underside of the roof of a conventional closed car.

The upward thrust of the spring 50 against the washer 51, held in place by the cotter pin 52 is transmitted to the shoulder 32 of the front shade supporting rod bracket 30, through the shaft 31, since the shaft 31 slides in the bore 14 of the boss 12 and the square bore 41 of the wedge piece 40. This upward thrust is in turn transmitted to the sleeve 20, by the shoulder 32 which bears upon the lower edge of the sleeve 20, and thus keeps the coned inside surface 21 of the sleeve 20 in snug frictional engagement with the tapered outside surface of the thimble 15. At the same time, the thrust of the spring 50 downwardly against the wedge piece 40, maintains the outer surface of the wedge piece 40 in snug frictional engagement with the tapered inside surface of the well 13.

The taper of the tapered surfaces is slight, preferably on the order of three degrees, and the bearing area of the tapered parts is large. This insures a snug fit and a continuous and effective compensation for wear, without excessive compression of the spring 50. It also insures that the front and side shades may be rotated about the vertical axis, independently of one another, since the bearing surfaces of the tapered parts are far greater than the bearing surface between the shoulder 32 and the lower edge of the sleeve 20, which are the only surfaces which would tend to make the rod holding brackets turn with one another.

Figure 7:
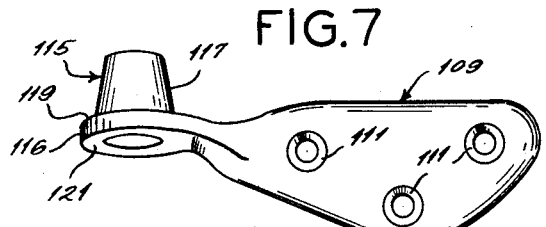
Figure 7 is a view in perspective of a part of the mounting shown in Figure 6.
Figure 8:
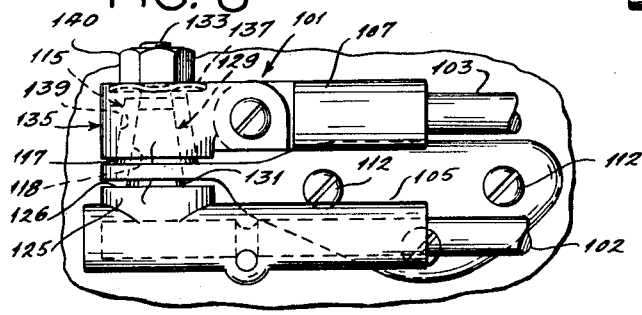
Figure 8 is a view in side elevation of the mounting shown in Figure 6, in its assembled condition.

Referring now to Figures 6 through 8, for another illustrative embodiment of the visor of this invention, reference numeral 101 indicates a mounting assembly, carrying a front shade-supporting rod 102 and a side shade-supporting rod 103. The front shade-supporting rod 102 is mounted in a front rod bracket 105. The side shade-supporting rod 103 is mounted in a side rod bracket 107. A mounting plate 109 serves to secure the entire assembly 101 to the inside of a vehicle. The mounting plate 109 of this embodiment is particularly adapted to use in automobiles with convertible or hard top roofs, but it also can be used in other models.

In the embodiment shown in Figures 6 through 8, the mounting plate 109 is provided with holes 111 through which screws 112 are driven into the frame of an automobile. The configuration of the mounting plate 109 will depend upon the contour of the particular kind of vehicle, but the shape of plate shown is adapted to fit almost any of the present models of United States' automobiles. At one end of the mounting plate 109, and in such a position as to be substantially vertical when the mounting plate 109 is attached to the interior of an automobile, is an open-ended thimble 115, with a rim 116 at its base. The thimble 115 has an upwardly convergently coned outer surface 117 and an upwardly convergently coned inner surface 118. The inner surface 118 extends through the rim 116. The rim 116 has an upper flat face 119 and a lower flat face 121.

The front rod bracket 105 is provided with a round platform 125 with a flat upper surface 126. Extending upwardly from the platform 125 is a shaft 129 having an upwardly convergent cone section 131 and, on its upper end, a threaded section 133. The cone section 131 has substantially the same slope as the inner surface 118 of the thimble 115.

The side rod bracket 107 is provided with a sleeve 135. At its upper end, the sleeve 135 has a shallow counter-bore 136 proportioned to accommodate a spring washer 137. Between the counter-bore 136 and the bottom of the sleeve 135, sleeve 135 has a bore 139 which is coned convergently upwardly at an angle substantially the same as that of the outer surface 117 of the thimble 115.

The diameter of the cone section 31 at its base is slightly greater than the inside diameter of the thimble 115 at the bottom surface of the rim 116. The diameter of the coned bore 139 at its lower end is slightly less than the outside diameter of the thimble 115 at the upper surface of the rim 116.

A nut 140 fits on the threaded section 133 of the shaft 129.

As shown in Figure 8, when the parts are assembled, the nut 140 is screwed down on the spring washer 137, thus pulling the cone section 131 into engagement with the coned inner surface 118 of the thimble 115 and pushing the coned bore 139 of the sleeve 135 into engagement with the coned outer surface 117 of the thimble 115. The relative sizes of the various parts are such that the bottom surface of the sleeve 135 does not engage the upper surface 119 of the rim 116 nor does the upper surface 126 of the platform 125 engage the lower surface 121 of the rim 116. The spaces between these surfaces allows for wear of the bearing surfaces and the spring of the spring washer 137 holding the parts in frictional engagement as they wear. In practice, the wear is slight, so that the mounting will generally stay in adjustment for the life of an automobile. While the wear is slight, it would, without the automatic compensating of the washer and the coned bearing surfaces, lead to the brackets becoming undesirably loose.

In the operation of the device of this embodiment, the various parts are assembled as shown in Figure 8, and the nut 140 is turned down on the threaded section of the shaft 129 until the desired amount of resistance to the turning of the brackets 105 and 107 is obtained. When the rod bracket 105 is turned, the cone section 31 is turned against the surface 118. At the same time, the nut 140 and spring washer 137 move relative to one another or both may move with respect to the counter-bore 136. This does not move the side bracket 107 because the bore 139 and the cone 131 are tapered at such a slight angle, for example, three degrees, that the nut 140 need not be turned very tightly to obtain a strong resistance to turning in the rod-holding brackets. It can be seen that as the bearing surfaces wear, the resilience of the spring washer will take up any slack that otherwise might appear. Again, for the reason that the cones tend to wedge so that relatively little pressure of the spring washer is necessary, the spring washer can take up the wear over a long period of time before the parts become loose. If they should become loose, it is only necessary to tighten the nut 140, as long as there is clearance between the brackets and the top and bottom surfaces of the rim 116.

Figure 9:
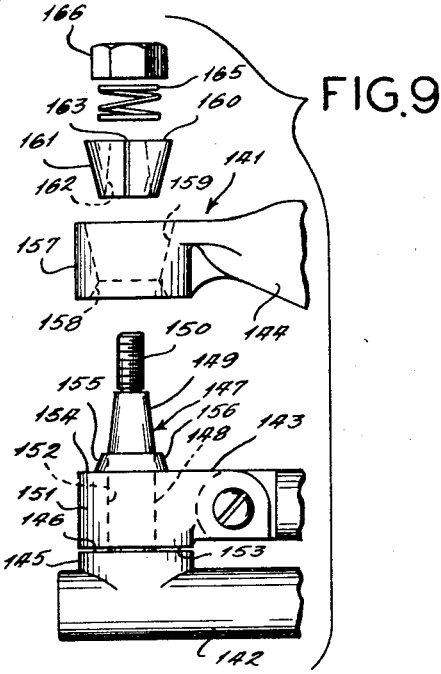
Figure 9 is an exploded view in side elevation of a device constructed in accordance with another embodiment of this invention.

Referring now to Figure 9 for another embodiment of this invention, a mounting assembly 141 is shown having a front rod bracket 142, a side rod bracket 143 and a mounting plate 144. In this embodiment the front rod bracket 142 is provided with a platform 145 having a flat upper surface 146 from the center of which a shaft 147 projects upwardly. The shaft 147 has, in succession from the platform 145, a straight section 148, an upwardly convergent cone section 149 and a threaded section 150.

The side rod bracket 143 is provided with a sleeve 151 having a straight bore 152 proportioned to slideably fit the straight portion 148 of the shaft 147. The sleeve 151 has a flat bottom surface 153 and on its upper surface 154 is provided with a collar 155. The collar 155 extends around the perimeter of the bore 148. The radially outer surface 156 of the collar 155 is coned convergently upwardly.

The mounting plate 144 is provided with a mounting plate boss 157 the bore of which is tapered in two directions. A lower bore 158 is chamfered convergently upwardly to form a seat for the collar 155. An upper bore 159 is coned divergently upwardly to seat a split ring 160. The split ring 160 is a circular double wedge with an outside surface 161 tapering divergently upwardly and an inside surface 162 tapering convergently upwardly, The split ring 160 is split at one side as shown at 163. The greatest diameter of the upper bore 159 of the mounting plate boss 157 is slightly smaller than the greatest diameter of the outer surface 161 of the split ring 160. The greatest diameter of the lower bore 158 is slightly less than that of the collar 155. At the same time, the greatest diameter of the cone section 149 of the shaft 147 is slightly greater than the inside diameter of the ring 160. A coil spring 165 is proportioned to slip over the threaded section 150 and to bear on the top of the ring 160. The nut 166 fits on the threaded section 150.

In assembling the device of the embodiment shown in Figure 9, the sleeve 151 of the side rod bracket 143 is slipped over the threaded section 150 and cone section 149 and onto the straight section 148 of the shaft 147. The smooth face 153 of the sleeve 151 rests upon the smooth face 156 of the platform 145. In this position the cone 149 projects from the upper face of the collar 155. The shaft 147 is then inserted from the bottom within the bore of the boss 157 of the mounting plate 144. The outer surface 156 of the coned collar 155 seats within the coned lower bore 158 of the boss 157 in such a way that a space is left between the lowermost surface of the boss 157 and the flat upper face of the sleeve 151. The split ring 160 is then slipped over the threaded section 150 and onto the cone section 149 of the shaft 147, seating in the upper bore 159 of the boss 157. In that position, there is an axial gap between the top of the collar 155 and the bottom of the ring 160 and between the top of the lower bore 158 and the ring 160. The spring 165 is then placed over the threaded section 150 of the shaft 147, resting on top of the split ring 160, and the nut 166 is screwed down on the threaded section 150 to complete the assembly.

Figure 10:
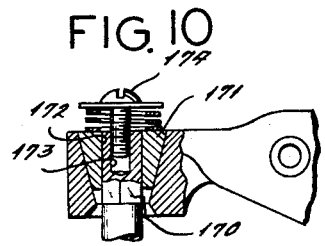
Figure 10 is a detailed view of a modified form of the embodiment shown in Figure 9.

In the device of this embodiment, the slopes of the sides of the cone 149 and of the outer surface 161 of the ring 160 are steep so that they offer greater resistance to turning than the coned collar 155. Thus when the side rod is turned, the front rod bracket remains motionless. At the same time, the collar 155 offers more resistance to turning than the flat surfaces 146 and 153, so that the side rod bracket remains in position when the front rod bracket is turned. The provision of the split ring 160 makes it possible to use a round shaft 147 without splines or keys. In Figure 10 is shown a modification of the device shown in Figure 9 in which the shaft 147 is provided with a hexagonal section 170 down to the top of the collar 155. A ring 171 with cone-shaped sides is provided with a hexagonal bore 172 corresponding with the configuration of the shaft. In the embodiment there shown, the shaft is drilled and tapped at 173 to take a stud instead of being provided with an externally threaded section, but these are equivalent constructions. In this embodiment the ring 171 is in effect a part of the front rod bracket, being fixed against rotation with respect to the shaft 147 although it is permitted axial movement with respect to the shaft.

The assembly of the device in Figure 10 is substantially the same as that in Figure 9.

It can be seen that in any of the devices in which the split ring is used, the split ring must be made of a material which is capable of being sprung out by the wedging action of the cone-shaped section upon which it is forced. Such materials are well known to the art and include brass and other bearing materials, and a number of suitable plastics.

Numerous variations in the construction of the device of this invention within the scope of the claims will become apparent to those skilled in the art in the light of the foregoing disclosure. For example, in the embodiments shown in Figures 6–10, there may be a reversal of parts by inverting the thimble or sleeve (the coned bearing surfaces) of the mounting plate, and, in effect, making the side rod bracket the front rod bracket and vice versa, putting the tensioning nut at the bottom instead of the top.

Thus it can be seen that a sturdy, simple, compact, self-adjusting sunshade bracket mounting is provided, which is adaptable to windshield-equipped vehicles of almost any description.

Having thus described the invention, what is claimed and desired to be secured by Letters Patent is:

1. In a double sun visor having front and side shades with shade supporting rods carried by front and side shade rod supporting brackets forming a part of a mounting assembly, the improvement in mounting assembly comprising a mounting plate, said mounting plate having a hollow, open-ended boss with two separate conical bearing surfaces, the side shade rod supporting bracket having a sleeve with a bearing surface complementary to one of the conical bearing surfaces of the said boss and in frictional engagement therewith, the front shade rod supporting bracket having a shaft, fixed with respect to said front shade rod supporting bracket and carrying a conical bearing surface complementary to the other of the conical bearing surfaces of the said boss, resilient means on said shaft, and means, carried by said shaft, by which said resilient means is compressed axially of said shaft, to bias the said shaft axially and to urge the various conical bearing surfaces continuously into frictional engagement.

2. In a double sun visor having front and side shades with shade supporting rods carried by front and side shade rod supporting brackets forming a part of a mounting assembly, the improvement in mounting assembly comprising a mounting plate, said mounting plate having a hollow, open-ended boss with two separate conical bearing surfaces, one of said surfaces defining an inverted conical bore at the upper end of said boss, the other of said conical surfaces being at its lower end, the side shade rod supporting bracket having a sleeve with a bearing surface complementary to the lower conical bearing surface of said boss, the front shade rod supporting bracket having a flat bearing surface and a shaft extending from said surface through the sleeve of said side shade rod supporting bracket and through said boss, a separate conical wedge piece carried on said shaft and moveable axially thereon, said separate wedge piece having a bearing surface complementary to the surface of the conical bore of said boss, resilient means on said shaft bearing on said wedge piece, and retaining means, carried by said shaft, upon which said resilient means bears, said resilient means being compressed between said wedge piece and said retaining means, to bias the shaft axially.

3. In a double sun visor having front and side shades with shade supporting rods carried by front and side shade supporting rod brackets forming a part of a mounting assembly, the improvement in mounting assemblies comprising a mounting plate having a hollow, open-ended boss with two separate conical bearing surfaces, one of said bearing surfaces defining an inverted conical bore at the upper end of said boss and the other of said bearing surfaces being on the outer surface of the lower end of said boss, the side shade rod supporting bracket having a sleeve with a bearing surface complementary to the conical bearing surface at the lower end of the boss, and in engagement therewith, the front shade rod supporting bracket having a flat bearing surface with a shaft projecting therefrom, said shaft extending through the sleeve of the side shade rod supporting bracket and through said boss, said shaft having a non-circular section within the conical bore of the boss, a cone piece slideably mounted on the non-circular section of the shaft, said wedge piece having an outer bearing surface complementary to the bearing surface of the conical bore of said boss and in engagement therewith, resilient means on the shaft, and retaining means on the shaft, said resilient means being compressed between the top of the wedge piece and the said retaining means.

4. In a double sun visor having front and side shades carried by lower and upper rod brackets rotatable about a substantially vertical axis, the improvement comprising a mounting plate adapted to be mounted above the windshield of a vehicle, said mounting plate carrying a boss in the form of a thimble having an upwardly convergent, conical outer surface and an upwardly convergent, conical bore, one of the rod brackets being provided with a sleeve having an upwardly convergent conical bore complementary to the outer surface of said thimble and in engagement therewith, the other of said brackets being provided with a shaft having a section with an upwardly convergent, conical surface complementary to the bore of the thimble and in engagement therewith, and means, on the upper end of the shaft, continuously urging the conical surfaces into engagement.

References Cited in the file of this patent

UNITED STATES PATENTS

| | | |
|---|---|---|
| 598,202 | Harrell | Feb. 1, 1898 |
| 1,372,327 | Young | Mar. 22, 1921 |